C. & M. STEVENS.
Clock.
No. 34,599.
Patented March 4, 1862.
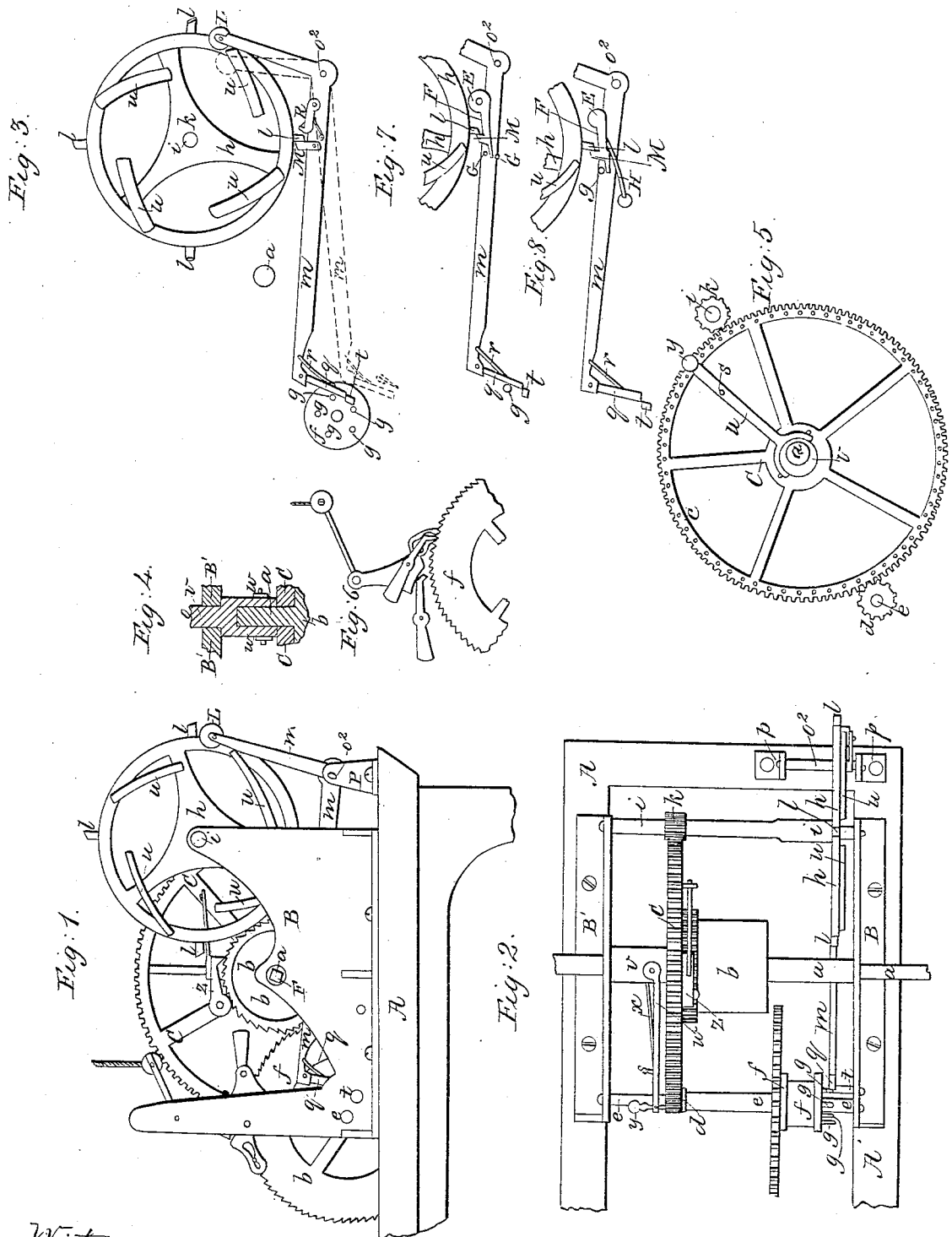

UNITED STATES PATENT OFFICE.

COLLINS STEVENS AND MUNROE STEVENS, OF BOSTON, MASSACHUSETTS.

IMPROVEMENT IN CLOCKS.

Specification forming part of Letters Patent No. 34,599, dated March 4, 1862.

*To all whom it may concern:*

Be it known that we, COLLINS STEVENS and MUNROE STEVENS, both of Boston, in the county of Suffolk and Commonwealth of Massachusetts, have invented a new and useful machine and a new and Improved Method of Constructing Time-Keepers, styled "Stevens's Detached Remontoir;" and we do declare that the following is a full, clear, and accurate description of such machine and of its construction and operation, reference being had to the annexed drawings, making a part of this specification, of which—

Figure 1 is a side elevation, and Fig. 2 a plan, of a turret-clock. Fig. 3 represents the detached lever $m$ $m$ and detent M and their connection with the scape-wheel and the wheel $h$. Fig. 5 exhibits the wheel $c$, the pinions $d$ and $k$, and also shows the arm $w$ and its socket $v$. Fig. 4 is a section of the socket $v$ and the parts near such socket; and Fig 6 is a section of the escapement, which is omitted in the other drawings, except in Fig. 1.

The description of the clock is as follows: The two parallel plates B B' are about ten inches apart and are fastened to the frame A by screws. The shafts $a\,a$, $e\,e$, and $i\,i$ revolve on journals in said plates, except only one end of the shaft $a\,a$, which turns in the socket $v$, the socket $v$ turning on a journal in the plate B'. A drum for the driving-weight of the clock, with a ratchet-wheel marked $b$, is fixed on the shaft $a\,a$. Upon the shaft $a\,a$, between said ratchet-wheel $b$ and said socket $v$, is the wheel $c$, connected with said ratchet-wheel by the click or pawl Z, so that when the weight is being wound upon the drum $b$ the click or pawl shall slip over the ratchet, but so that when the weight is running down the wheel and ratchet shall turn together. The wheel $c$ has near its perimeter and on the side toward the socket $v$ sixty holes, each equidistant from the next. Hinged upon the socket $v$ is the arm $w$, having near its extremity the pin $y$, which fits and is easily inserted into any one of said holes. The spring $x$ causes the pin $y$ to remain in the hole in which it is so set, and when thus set the wheel and socket turn together. The wheel $c$ has upon its perimeter one hundred and twenty teeth and plays into a pinion $d$, fixed on the shaft $e\,e$, having ten teeth, and into another $k$, fixed on the shaft $i\,i$, having eight teeth, so that the shaft $e\,e$ turns twelve times and the shaft $i\,i$ fifteen times during one revolution of the wheel $c$. The scape-wheel $f\,f$ has one hundred teeth and turns loosely about the shaft $e\,e$. Within the drum of said wheel a spring is placed, one end of which is fastened to the shaft $e\,e$ and the other end with the scape-wheel $f$, so that any revolution of the shaft caused by the weight at $b$ would wind the spring by coiling it about the shaft $a\,a$ like a watch-spring, and the uncoiling of the spring thus wound would furnish power sufficient to drive the pendulum and to let off the weight at $b$. Upon the side of the drum $f$ of the scape-wheel are five pins, each marked $g$. The escapement used is one with a stationary pallet. A section of the pallets of such escapement is shown in Fig. 6; but other escapements may be used, such escapement being no part of this invention. A second-and-a-half pendulum is required to make the clock described run to time. Fixed upon the shaft $i\,i$ is the wheel $h$, having upon its perimeter four teeth or projections, each marked $l$, and upon one side four cams, each marked $u$. Directly below the wheel $h$ is the lever $m$, which turns on the shaft $o^2$ as a fulcrum, such shaft turning on journals in the plates $p\,p$. At one extremity of the lever $m$, turning perpendicular on a hinge in said lever, is the arm $q$, which is kept when undisturbed in the relative position represented in Fig. 3 by the spring $r$. This arm rests when the machinery of the clock is locked on the stud $t$, which is fixed in the plate B. As the pendulum of the clock vibrates, each of the pins on the scape-wheel in its turn approaches the arm $q$ and pushes it off the stud $t$, when the arm $q$ and the lever $m$ fall. Upon the upper side of the lever $m$ and immediately under the wheel $h$ is the tooth or detent M, which is so arranged that when the lever is locked or rests on the stud $t$ one of the teeth or projections $l$ on the wheel $h$ presses against and is detained by the tooth or detent M. The tooth M is so placed that the force of the weight of the clock which tends to turn the wheel at $l$ is exerted in a direct line toward or from the fulcrum-shaft $o^2$ and is spent there, and has little power or tendency to turn the lever $m$ either way about the fulcrum, whatever such weight may be. The wheel being thus locked cannot be unlocked except by pushing the arm $q$ off the stud $t$, which is done by one of said pins $g$, as described. Extending backward and upward from the fulcrum $o^2$ is an arm of the lever $m$, near the extremity of which the roller L is placed in such a manner that whenever said lever $m\ m$ drops the roller L is caught upon one of the cams $u$, and as the wheel $h$ is now completely unlocked it turns by force of the weight at the drum $b$ and lifts the arm $q$ of the lever over the pin $g$ which pushed it off the stud $t$, and the cam passes, and the lever, being free, falls with the arm behind the pin $g$ which pushed it off, ready to be pushed off by the next pin. The click R is to prevent back action while the clock is being wound. It is not necessary that the tooth or detent M should be fastened to or be directly upon the lever $m\ m$ or that the center of motion of both should be the same. Fig. 7 represents a modification of said lever in which the tooth or detent M is on a separate piece F and moves about a different pivot or center E. The line of pressure of the tooth or projection $l$ upon the tooth or detent M is directly toward or from the center or pivot at E and is spent there and not upon the lever. This separate piece is connected with the lever $m$ by two pins G and G', so that whenever the lever falls the tooth or detent falls with it, and it is relifted by the lifting of the lever in like manner, as in the clock above described.

The machine operates as follows: A weight or chain is attached to the drum $b$, and is wound by a key applied at T. Hands are attached to the end of the socket-shaft $v$ at O, ordinary dial-work connecting the hour and minute hands. A pendulum, beating twice in three seconds is connected with the escapement. The spring in the scape-wheel drum is partly wound, and the pendulum is set vibrating. As the scape-wheel turns, one of the pins $g$ approaches the arm $q$ and pushes it off the stud $t$. The lever $m\ m$ immediately drops, drawing the tooth or detent M away from the tooth or projection $l$ which pressed against it, and the wheel $h$ immediately begins to turn, as, also, does the wheel $c$ and the shaft $e$. In turning, the wheel $h$ lifts the lever back to its place ready to be acted upon by the next pin and brings the next tooth or projection $l$ against the tooth or detent M, and the same operation is repeated until the weight is run down. Every time the wheel $h$ turns, as described, the shaft $i\ i$ will also be turned, and in being turned will coil the spring connecting the shaft $e\ e$ and the scape-wheel $f$, and the subsequent uncoiling of the spring thus coiled will furnish sufficient power to maintain the vibrations of the pendulum and push the arm $q$ of the stud $t$. As the scape-wheel by the motion of the pendulum turns once in five minutes, it follows that the lever $m\ m$ will be let off every minute, that every four minutes the wheel $h$ and the shaft $i\ i$ will have made one revolution, and that the wheel C will turn once in an hour, and that the spring in the box of the scape-wheel will be wound every minute one-fifth of a turn.

The pin S on the arm $w$ is for letting off the machinery for striking the hour.

It will be seen and noticed that between the shaft $i\ i$ and the wheel $f$ there are two unlockings—one at $q$ and $t$ caused by one of the pins $g$ pushing the arm $q$ off the stud $t$ and the other caused by the weight or momentum of the falling lever drawing the tooth or detent M away from the tooth or projection $l$ of the wheel $h$—and that the wheel $h$, by being so unlocked, commences to rotate by the falling of the weight at $b$, and thereby the lever $m$ is relocked at M and $t$ and the scape-wheel spring is rewound.

By a slight modification in the arrangement of the parts of this clock and the lever and detent the scape-wheel $ff$ may be placed on the shaft $i\ i$ and the spring of the scape-wheel be wound by the rotation of said shaft, and by using springs and two detents, or a double-acting detent, the lever may be locked and unlocked at $t$ in both directions, which is desirable in small time-pieces.

If in the plan described above and represented in Fig. 7 we remove the pin G' and substitute a spring in its place, pressing the detent upward, as is represented in Fig. 8, such spring being designated H, the wheel $h$ will be unlocked by the falling of the lever, substantially as described; but the upward force of the spring will relock the wheel $h$ independently of the lever, but, substantially as described, as soon as the lever $m\ m$ is moved out of the way of the detent M.

The object we have sought to accomplish is to make the locking of a remontoir time-piece as light and as easily unlocked as possible. This we have accomplished by the peculiar mode of locking at M. The whole or nearly the whole pressure caused by the driving-weight of the clock is resisted and received upon the pivot or support at or toward the center of motion of the tooth or detent M, and no force is required for unlocking the wheel $h$, except sufficient to overcome the friction at M and at the center of motion of the tooth or detent caused by the pressure produced by the driving-weight of the clock and a slight excess of force sufficient to lock the lever as lightly as possible at the stud $t$. The force required at the scape-wheel for unlocking the lever $m$ is merely sufficient to push the arm $q$ off the stud $t$, which may be very small.

By extending the socket $v$ through the plate B' the minute-hand of the clock may be attached at T. As the socket turns loosely on and is otherwise disconnected with the shaft $a\ a$, the main weight may be wound on the drum $b$ without disturbing the socket. While the pin $y$ is in one of its holes, the wheel $c$ and the socket turn as one piece. If the hands were attached at T, moving the hands would disturb the wheel $c$. When we wish to move the hands, we withdraw the pin $y$ from the hole in the wheel $c$, into which it is inserted, and move it backward or forward until the hands mark the proper hour and minute, when the pin $y$ is inserted into the nearest hole, where it is retained by the pressure of the spring $x$. This is a very simple method of connecting the minute-hand with the clock, requiring no gear and easy to set.

We do not claim the method of pushing the arm $q$ off the stud $t$, nor the method of winding the scape-wheel spring by the rotation of the shaft $e\ e$.

What we claim, and desire to secure by Letters Patent, is—

1. The tooth or detent M, turning about a center pivot or support, as described, in connection with the lever $m\ m$, substantially as and for the purposes set forth.

2. The method of relifting and relocking the lever $m\ m$ and the tooth or detent M by the cams $u$, substantially as described.

3. The combination of the wheel $h$, the wheel $c$, and the shaft $i$, as described, for the purpose of rewinding the spring at the scape-wheel, substantially as described.

4. The socket $v$, protruding through the plate B′ in the manner described, in combination with the arm $w$, the pin $y$, and the spring $x$, substantially as described, for the purpose of setting the time part of the clock.

COLLINS STEVENS.
MUNROE STEVENS.

Witnesses:
  E. H. MERRILL,
  GEO. F. WALKER.